US010355437B2

(12) United States Patent
Sarraf et al.

(10) Patent No.: US 10,355,437 B2
(45) Date of Patent: Jul. 16, 2019

(54) TERMINAL CRIMPING MACHINE INCLUDING AN ELECTRICAL CRIMP CONSOLIDATION CIRCUIT

(71) Applicants: TYCO ELECTRONICS CORPORATION, Berwyn, PA (US); TE CONNECTIVITY GERMANY GmbH, Bensheim (DE)

(72) Inventors: David Bruce Sarraf, Elizabethtown, PA (US); Helge Schmidt, Speyer (DE)

(73) Assignees: TE CONNECTIVITY CORPORATION, Berwyn, PA (US); TE CONNECTIVITY GERMANY GMBH, Bensheim (DE)

( * ) Notice: Subject to any disclaimer, the term of this patent is extended or adjusted under 35 U.S.C. 154(b) by 196 days.

(21) Appl. No.: 15/341,148

(22) Filed: Nov. 2, 2016

(65) Prior Publication Data

US 2018/0123303 A1 May 3, 2018

(51) Int. Cl.

| | |
|---|---|
| ***B23P 19/00*** | (2006.01) |
| ***H01R 43/042*** | (2006.01) |
| ***H01R 43/048*** | (2006.01) |
| ***H01R 4/18*** | (2006.01) |
| *H01R 43/02* | (2006.01) |

(52) U.S. Cl.

CPC ........... *H01R 43/048* (2013.01); *H01R 4/183* (2013.01); *H01R 4/187* (2013.01); *H01R 43/0214* (2013.01)

(58) Field of Classification Search

CPC ...... G01N 29/04; G01N 29/07; G01N 29/221; G01N 29/265; H01R 43/048; H01R 43/0486; H01R 43/0488; H01R 43/058; H01R 43/0207

See application file for complete search history.

(56) References Cited

U.S. PATENT DOCUMENTS 4,653,841 A * 3/1987 Plyler .................... H01R 33/06 439/660
5,197,186 A * 3/1993 Strong ................ B30B 15/0094 29/705
5,200,576 A * 4/1993 Schrader ................ H01R 4/186 174/71 R
5,490,406 A * 2/1996 College .............. H01R 43/0486 29/715

(Continued)

FOREIGN PATENT DOCUMENTS

JP 2003010975 A 1/2003
JP 2003272728 A 9/2003
WO 2015029347 A1 3/2015

OTHER PUBLICATIONS

International Search Report, International Application No. PCT/IB2017/056760, International Filing Date Oct. 31, 2017.

(Continued)

*Primary Examiner* — Paul D Kim

(57) ABSTRACT

A terminal crimping machine includes crimp tooling defining a crimping zone that receives a terminal and a wire and is actuated during a crimp stroke to form a crimped segment between the terminal and the wire. The terminal crimping machine includes an electrical crimp consolidation circuit electrically connected to the crimped segment and operated during the crimp stroke to provide an electrical pulse to at least one of the wire and the terminal of the crimped segment before completion of the crimp stroke.

17 Claims, 5 Drawing Sheets

(56) References Cited

U.S. PATENT DOCUMENTS

| | | | | |
|---|---|---|---|---|
| 7,181,942 | B2 * | 2/2007 | Yost | H01R 43/048<br>29/705 |
| 7,665,224 | B2 * | 2/2010 | Yagi | G01R 31/045<br>33/783 |
| 8,671,551 | B2 * | 3/2014 | Yost | H01R 43/0486<br>29/407.05 |
| 9,362,700 | B2 * | 6/2016 | Charlton | H01R 43/0488 |
| 2013/0197823 | A1 * | 8/2013 | Williams | G01N 29/44<br>702/39 |
| 2015/0357781 | A1 * | 12/2015 | Maalouf | G01N 29/11<br>29/705 |
| 2015/0372437 | A1 | 12/2015 | Morris et al. | |
| 2016/0104994 | A1 * | 4/2016 | Cramer | H01R 43/0486<br>29/863 |

OTHER PUBLICATIONS

Tyco Electronics Ltd., "Diagnostics of Relays Relay Products—Automotive Application Notes", Microsystem Technologies, vol. 4, No. 3, May 27, 1998, pp. 122-124.

* cited by examiner

TERMINAL CRIMPING MACHINE INCLUDING AN ELECTRICAL CRIMP CONSOLIDATION CIRCUIT

BACKGROUND OF THE INVENTION

The subject matter herein relates generally to terminal crimping machines for crimping electrical terminals to a wire.

Terminal crimping machines have long been used in the connector industry to effect high-speed mass termination of various cables. It is common practice for the terminal crimping machine to have an applicator that holds crimp tooling, such as an anvil and a movable ram, and a driving actuator that moves the ram relative to the anvil during a crimping stroke to crimp a terminal or connector to an end of a wire.

However, crimped electrical connections may have degraded electrical performance, such as from high electrical resistance at the terminal/wire interface or between strands of the wire. For example, surface oxide that forms on the outer surface of the wires, such as on aluminum wires, presents problems in the crimped termination. The oxide film is an electrical insulator and is difficult to displace during crimping, particularly on inner strands of the wire that do not engage the crimp barrel of the terminal. Many of the strands within the crimped wire bundle can be electrically isolated from the termination, which can result in higher than expected crimp resistance, less stable crimp resistance, and the potential for excess heating of the termination.

Some known terminals use high pressure contact points such as serrations or indentations along the crimp barrel to increase wire deformation and enhance the displacement of the oxide film that contacts the crimp barrel. However, such serrations only affect the outer strands and have no effect on the oxide films on the inner strands. Also, the high pressure features can be difficult to produce and can require high crimping effort. Other known terminals use of additives such as brass powder or brass screens that puncture the oxide and form intermetallic bridges between strands. However, the additives increase cost and process complexity and can serve as contaminants to adjacent processes.

A need remains for a crimped terminal having low resistance at the crimped terminal/wire interface and between the strands of the wire.

BRIEF DESCRIPTION OF THE INVENTION

In one embodiment, a terminal crimping machine is provided including crimp tooling defining a crimping zone that receives a terminal and a wire and is actuated during a crimp stroke to form a crimped segment between the terminal and the wire. The terminal crimping machine includes an electrical crimp consolidation circuit electrically connected to the crimped segment and operated during the crimp stroke to provide an electrical pulse to at least one of the wire and the terminal of the crimped segment before completion of the crimp stroke.

In another embodiment, a terminal crimping machine is provided that crimps a terminal to a wire. The terminal crimping machine includes a termination tool having an actuator and crimp tooling including an anvil and a ram movable by the actuator. A crimping zone is defined between the ram and the anvil that receives the terminal and the wire. The ram is actuated by the actuator during a crimp stroke in an advancing direction to from a crimped segment between the terminal and the wire and then is actuated by the ram in a retracting direction. The ram is actuated by the actuator in the advancing direction from a released position to an initial contact position where the ram makes initial contact with the terminal. The ram is actuated by the actuator in the advancing direction from the initial contact position to a bottom dead center position where the ram is at the closest position to the anvil during the crimp stroke. The ram is actuated by the actuator in the retracting direction from the bottom dead center position to a separation position where the ram separates from the terminal. The ram is actuated by the actuator in the retracting direction from the separation position to the released position where the ram is at the furthest position from the anvil during the crimp stroke. The terminal crimping machine also includes an electrical crimp consolidation circuit electrically connected to the crimped segment and operated during the crimp stroke to provide an electrical pulse to at least one of the wire and the terminal after the ram is in the initial contact position and before the ram is in the bottom dead center position. The electrical crimp consolidation circuit includes a power supply having a capacitor storing energy, a switch coupled to the power supply and receiving the energy, and a trigger coupled to the switch for activating the switch to release the energy as the electrical pulse to the crimped segment during the crimp stroke.

In a further embodiment, a method of crimping a terminal to a wire is provided including positioning a terminal in a crimping zone between an anvil and a movable ram and actuating the ram through a crimp stroke from a released position in an advancing direction to a bottom dead center position and then in a retracting direction back to the released position. The ram crimps the terminal to the wire to form a crimped segment as the ram is moved in the advancing direction. The method includes sending an electrical pulse through the crimped segment during the crimp stroke as the ram is actuated in the advancing direction.

DETAILED DESCRIPTION OF THE INVENTION

Figure 1:
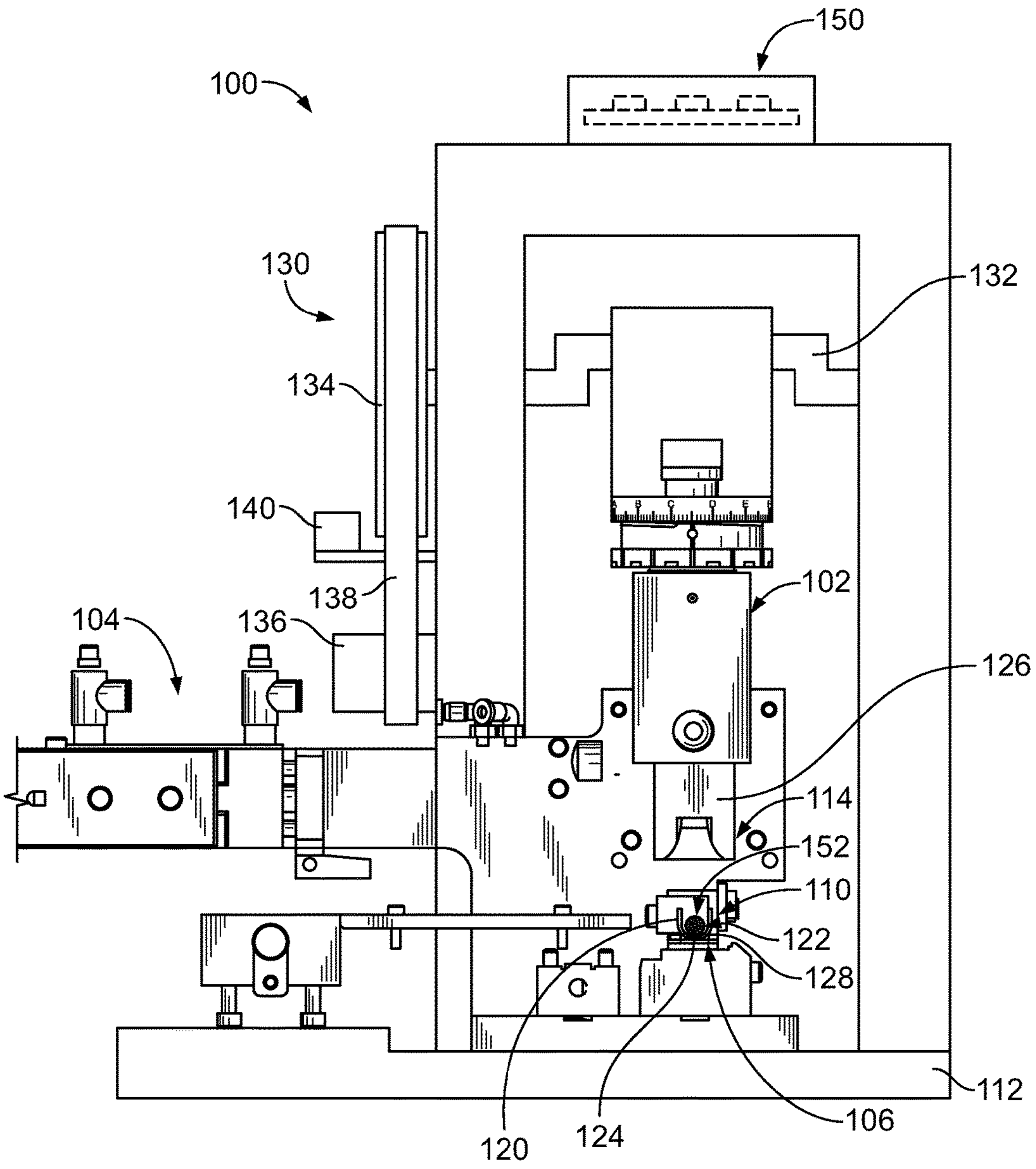
FIG. 1 is a front view of an exemplary embodiment of a terminal crimping machine having an electrical crimp consolidation circuit.
Figure 2:
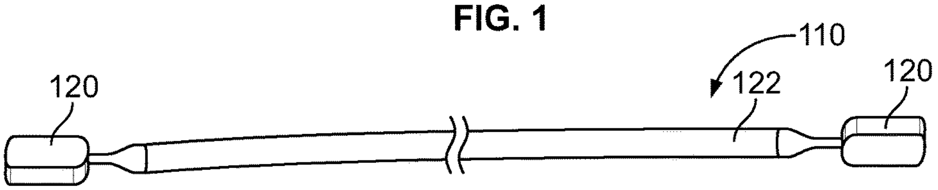
FIG. 2 illustrates an exemplary wire assembly formed in accordance with an exemplary embodiment using the terminal crimping machine shown in FIG. 1.

FIG. 1 is a front view of an exemplary embodiment of a terminal crimping machine 100 having a termination tool 102 used for crimping connectors or terminals 120 to wires 122 to form a wire assembly 110, however, any type of terminal crimping machines 100 used to crimp a terminal 120 to a wire 122 may be used. FIG. 2 illustrates an exemplary wire assembly 110 formed in accordance with an exemplary embodiment showing two terminals 120 provided at opposite ends of the wire 122; however, other types of wire assemblies may be manufactured by the terminal crimping machine 100 in alternative embodiments. In an exemplary embodiment, as shown in FIG. 1, the terminal crimping machine 100 is a terminator or press; however other types of terminal crimping machines may similarly be used, such as a lead maker, a bench machine, a hand crimping tool and the like. Furthermore, while the termination tool 102 is illustrated and described hereinafter with respect to an applicator (may be referred to hereinafter as applicator 102), other types of termination tools 102 may be used depending on the type of terminal crimping machine.

A terminal feeder 104 is used to feed terminals 120 to a crimping zone 106. In the illustrated embodiment, the terminal feeder 104 is an electrically actuated feeder; however other types of feeders, such as pneumatic feeders, cam and linkage feeders, and the like, may be used depending on the type of terminal crimping machine. The terminal feeder 104 may be a side feeder, an end feeder, or another type of feeder.

A wire feeder (not shown) may be used to feed the wire 122 to the crimping zone 106. The wire feeder may continuously feed the wire 122 from a spool or may feed an individual wire 122 to the crimping zone 106. For example, a cut to length wire 122 may be positioned in the crimping zone 106 by the wire feeder. A wire clamp may hold the wire 122 in position in the crimping zone 106 during the crimping process. In an exemplary embodiment, the wire 122 may be a stranded wire having a plurality of individual strands 124 within a common jacket. In an exemplary embodiment, the wires 122 are aluminum wires; however other types of wires may be used, such as copper wires.

The applicator 102 is coupled to a frame 112 of the terminal crimping machine 100. Crimp tooling 114 is coupled to the applicator 102 for crimping the electrical connectors or terminals 120 to an end of the corresponding wire 122 in the crimping zone 106. The applicator 102 may be removed and replaced with a different applicator, such as when a different size/type of terminal 120 is to be terminated, when a different size/type of wire 122 is to be terminated, when the applicator 102 is worn or damaged, or when an applicator having a different configuration is desired. As such, multiple applicators 102 may be used with each terminal crimping machine 100, and the different applicators 102 may have different set-up configurations. The crimp tooling 114 may be replaceable in the applicator 102, such as to change the shape of the crimp, the crimp height, and the like, such as to accommodate different size/type terminals 120 and/or different diameter wires 122.

In an exemplary embodiment, the crimp tooling 114 includes a ram 126 and a stationary anvil 128. During operation, the ram 126 is actuated or driven through a crimp stroke by a driving mechanism or actuator 130 of the terminal crimping machine 100. In the illustrated embodiment, the actuator 130 includes a crankshaft 132 and a flywheel 134 used to rotate the crankshaft 132. A driving motor 136 rotates the flywheel 134, such as using a belt or pulley 138. Other types of driving mechanisms 130 may be used in alternative embodiments, such as a linear actuator, a piezoelectric actuator, a pneumatic actuator, and the like. Optionally, the terminal crimping machine 100 may include a position sensor 140 for determining a position of the actuator 130. For example, the position sensor 140 may determine the rotational position of the flywheel 134 or the crankshaft 132 or the position sensor 140 may determine the axial position of the ram 126. The position sensor may be an optical sensor viewing a marking as a trigger; however other types of sensors may be used in alternative embodiments, such as a proximity sensor, a magnetic sensor, a mechanical sensor, and the like. Data from the position sensor 140 may be used to control other components of the terminal crimping machine 100. During operation, as the crankshaft 132 is rotated, the ram 126 is moved linearly up and down through a crimp stroke. The ram 126 is movable in an advancing direction and a retracting direction relative to the anvil 128 during the crimp stroke. The ram 126 engages the terminal 120 as the ram 126 is moved in the advancing direction to crimp the terminal 120 to the wire 122 at a crimped segment 152 to mechanically and electrically coupled the terminal 120 to the wire 122 at the crimped segment 152.

In an exemplary embodiment, the terminal crimping machine 100 includes an electrical crimp consolidation circuit 150 electrically connected to the crimped segment 152. The electrical crimp consolidation circuit 150 is operated during the crimp stroke to provide an electrical pulse to at least one of the wire 122 and the terminal 120 of the crimped segment 152 before completion of the crimp stroke. The electrical pulse causes fritting between the strands 124 of the wire 122 and/or between the terminal 120 and the strands 124 of the wire 122. The fritting enhances the mechanical and/or electrical connection between the strands 124 and between the terminal 120 and the wire 122 to reduce the electrical resistance of the wire assembly. For example, the electrical pulse may break through and/or break down any oxide layer on the surface of the strands 124 of the wire 122, promoting metal-to-metal interconnections. The electrical crimp consolidation circuit 150 applies an electrical potential between the strands 124 of the wire 122 and/or between the terminal 120 and the corresponding strands 124 of the wire 122 during the crimping operation. The electrical pulse is timed to occur during the advancing stroke as the ram 126 is forming the terminal 120 around the wire 122. For example, the timing of the electrical pulse may be based on data received from the position sensor 140. The electrical pulse may send high energy over a short duration during the crimp stroke to cause fritting at an appropriate time, such as after the strands 124 of the wire 122 start to compress together within the terminal 120, but prior to deformation of the strands 124. The timing of the electrical pulse may be tied to a target area index of the crimped segment 152 or to a target crimp height of the crimped segment 152.

During operation of the terminal crimping machine 100, the ram 126 is cyclically driven through the crimp stroke from a released position at a top of the crimp stroke to a crimping position, such as through a bottom dead center position at a bottom of the crimp stroke, then returning to the released position. The crimp stroke has both an advancing or downward component and a return or upward component.

The ram 126 is advanced downward toward the anvil 128 to an initial contact position, in which the ram 126 initially contacts the terminal 120. The ram 126 begins to form the crimped segment 152 at the initial contact position. The ram 126 continues downward in the advancing direction to the bottom dead center position. As the ram 126 is advanced from the initial contact position to the bottom dead center position, the ram 126 transitions through a crimp forming stage of the crimp stroke. The terminal 120 is formed around the wire 122 during the crimp forming stage. The crimp tooling 114 changes the shape of the terminal 120 around the wire 122 during the crimp forming stage. The crimped segment 152 is defined by the portion of the terminal 120 that is formed around the wire 122 and the portion of the wire 122 that is surrounded by the terminal 120. During the crimp stroke, the ram 126 initially forms a partially crimped segment and at the bottom dead center forms a final crimped segment. At both stages, the components may be referred to as the crimped segment 152.

As the terminal 120 is formed around the wire 122, the strands 124 begin to compress and close in toward each other. The spaces between the strands 124 are reduced. An area index (AI) of the wire 122 is reduced. For example, when the wire 122 is initially laid in the crimp barrel of the terminal 120, the wire 122 may have an area index at or near 100%. As the terminal 120 is formed around the wire 122, the AI may be reduced, such as to around 60%. The crimping of the terminal 120 to the wire 122 occurs during the downward component of the crimp stroke. The electrical pulse is sent by the electrical crimp consolidation circuit 150 during the downward component of the crimp stroke. In an exemplary embodiment, the timing of the electrical pulse is only a small fraction of the time of the downward component of the crimp stroke. The ram 126 then returns upward to the released position at the top of the crimp stroke. At some point during the releasing stage of the crimp stroke, the ram 126 separates from the terminal 120, referred to as the separation position of the ram 126. In the released position, the ram 126 is positioned away from the anvil 128 and from the terminal 120.

The total time of the crimp stroke depends on the terminal crimping machine 100 and the settings of the terminal crimping machine 100. In various embodiments, the crimp stroke may have a duration of approximately 350 milliseconds (ms). The active crimp cycle, such as from the initial contact position to the bottom dead center position, may be approximately 8 ms. The electrical pulse may be sent over a duration of approximately 1-2 ms. The electrical pulse may be sent at a time before the bottom dead center position, such as at a time approximately 3-4 ms before reaching the bottom dead center.

During the crimp forming stage, the terminal 120 compresses against the wire 122. The strands 124 are initially lightly gathered and compressed as the terminal 120 is formed around the wire 122. As the ram 126 continues to press downward on the terminal 120, the wire 122 may begin to deform. For example, the strands of the wire 122 may be extruded due to the compressive forces. The extrusion stage of the crimp forming stage occurs as the ram 126 approaches the bottom dead center position. For example, the compression stage may occur in the upper 80% of the crimp forming stage and the extrusion stage may occur in the bottom 20% of the crimp forming stage. In an exemplary embodiment, the electrical pulse is timed to occur in the compression stage and may cease prior to the extrusion stage.

Figure 3:
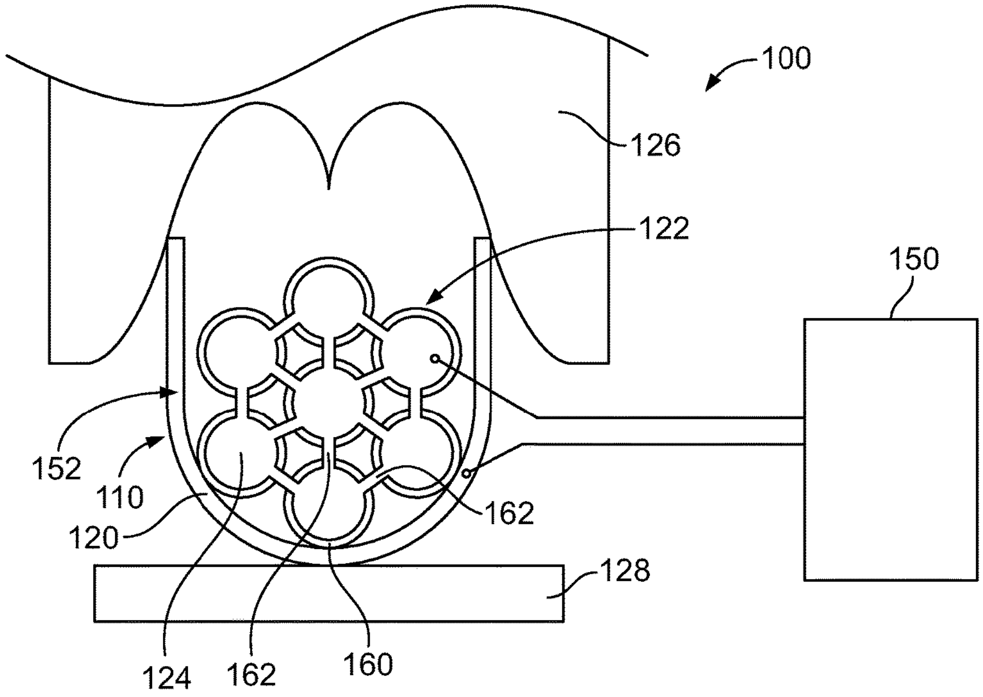
FIG. 3 is a schematic illustration of a portion of the terminal crimping machine showing the electrical crimp consolidation circuit coupled to the wire and the terminal.

FIG. 3 is a schematic illustration of a portion of the terminal crimping machine 100 showing the wire 122 positioned in the crimp barrel of the terminal 120 to from a crimped segment 152 and the actuator 130 forming the crimped segment 152. FIG. 3 shows the electrical crimp consolidation circuit 150 electrically connected to the crimped segment 152. The electrical crimp consolidation circuit 150 sends the electrical pulse to the crimped segment 152 during the crimping process, such as after the ram 126 is in the initial contact position and before the ram 126 is in the bottom dead center position.

In an exemplary embodiment, the electrical crimp consolidation circuit 150 is electrically connected to the wire 122 and to the terminal 120. The electrical crimp consolidation circuit 150 may be electrically connected to the wire 122 at any point along the length of the wire 122, such as the end opposite the segment being crimped. The electrical crimp consolidation circuit 150 may be electrically connected to the wire 122 through the terminal at the opposite end from the segment being crimped. The electrical crimp consolidation circuit 150 may be electrically connected to the wire 122 at the end of the spool of wire being used in manufacturing the wire assembly 110 (for example, prior to being cut or separated from the spool). The electrical crimp consolidation circuit 150 may be directly electrically connected to the wire 122 or may be indirectly electrically connected, such as through inductive coupling, capacitive coupling, and the like. The electrical crimp consolidation circuit 150 may be directly electrically connected to the terminal 120, such as by an alligator clip terminated to the terminal 120 or the carrier for the terminal 120. Alternatively, the electrical crimp consolidation circuit 150 may be indirectly electrically connected to the terminal 120, such as through the anvil 128 or other component of the terminal crimping machine 100 supporting the terminal 120.

The strands 124 are electrically conductive metal wire strands. For example, the strands 124 may be aluminum, copper or another metal. The strands 124 may have oxide layers 160 that build up on the outer surfaces of the strands 124. The surface oxide layers act as electrical insulators between the strands 124 and between the interfaces between the strands 124 and the terminal 120. Electrical performance of the wire assembly 110 is dependent on a good electrical connection between the strands 124 of the wire 122 and the terminal 120, as well as good electrical connection between the strands 124 themselves. For example, having each of the strands 124 conducting the current enhances performance of the wire assembly and reduces the overall heat generated in the wire 122, such as due to resistance.

The electrical crimp consolidation circuit 150 is used to send the electrical pulse through the wire 122 to enhance the electrical connection between the strands 124 and/or between the terminal 120 and the strands 124. For example, the electrical crimp consolidation circuit 150 promotes fritting of the oxide layers 160 at a-spots 162 where the strands 124 engage each other and/or where the strands 124 engage the terminal 160. The electrical crimp consolidation circuit 150 promotes A-fritting to break down the oxide layer(s) 160. For example, because the current in the strands 124 may be different, fritting may occur between the adjacent strands 124. The electrical crimp consolidation circuit 150 promotes A-fritting when the voltage gradient between the corresponding conductors reaches a threshold level, such as about $10^8$ V/m. The electrical crimp consolidation circuit 150 may promotes B-fritting after oxide breakdown at the a-spots 162. For example, the electrical crimp consolidation circuit 150 may promotes B-fritting to form metallic bridges between the strands 124 at the a-spots 162 when the current flow between the strands 124 quickly increases, which may result in increased inter-strand conductivity.

Figure 4:
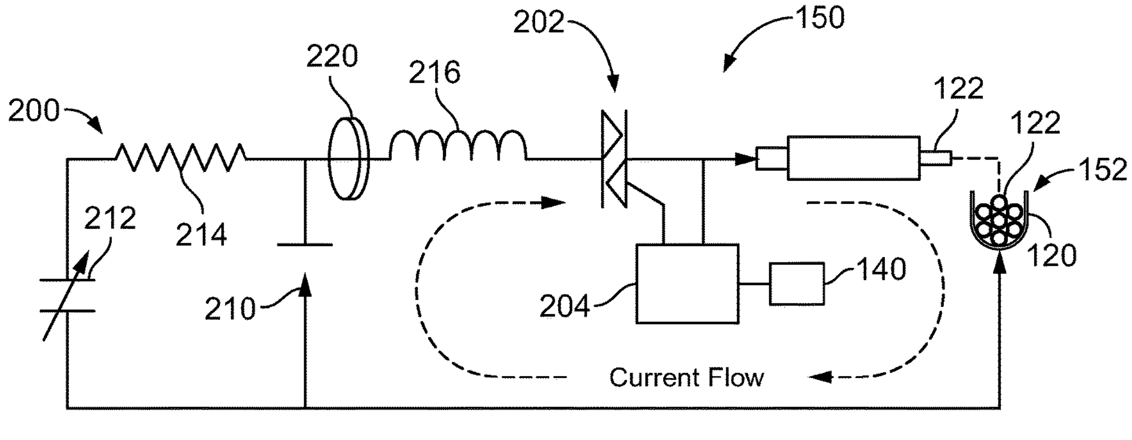
FIG. 4 is a schematic diagram of the electrical crimp consolidation circuit in accordance with an exemplary embodiment.

FIG. 4 is a schematic diagram of the electrical crimp consolidation circuit 150 in accordance with an exemplary embodiment. The electrical crimp consolidation circuit 150 is electrically connected to the crimped segment 152 and operated during the crimp stroke to provide an electrical pulse to at least one of the wire 122 or the terminal 120. The electrical crimp consolidation circuit 150 includes a power supply 200 providing energy for generating the electrical pulse, a switch 202 coupled to the load 200 for releasing the energy in the form of the electrical pulse, and a trigger 204 coupled to the switch for activating the switch 202 to release the energy as the electrical pulse to the crimped segment 152 during the crimp stroke.

The power supply 200 has a capacitor 210 configured to store energy used for the electrical pulse and a source 212 used to charge the capacitor 210. The source 212 may set the voltage for the electrical crimp consolidation circuit 150, such as at 60V, 120V, 180V, and the like. The source 212 may be an adjustable power supply.

A resistor 214 may be provided between the source 212 and the capacitor 210. The value of the resistor is low enough to allow the capacitor 210 to recharge before the next wire and terminal are processed. The value of the resistor 214 is high enough so that the charging current from the source 212 is less than the holding current of the switch 202. In an alternative embodiment, rather than providing the resistor 214, an active circuit may be provided that disconnects the source 212 from the capacitor 210 until the crimp cycle is complete. The active circuit may provide a higher charging current and faster recovery time without the risk of holding the switch 202 open.

The capacitor 210 may be a single capacitor or a bank of capacitors. For example, in an exemplary embodiment, the power supply 200 may include a bank of eight capacitors ranging from 100 micro-Farad through 1800 micro-Farad which may be charged through a current limited voltage source for independent adjustment of the discharge energy (for example, 3.25 J-13.0 J) and the charging potential (for example, 60V-180V).

An inductor 216 is provided between the capacitor 210 and the switch 202. The inductor 216 may limit the current provided to the switch 202 to a safe level. Optionally, the inductor 216 may be a series air-core inductor. The component values of the inductor 216 may be selected based on the other components of the circuit, such as the capacitor 210, the switch 202, the wire size, the wire type, the press speed, or other factors. In an exemplary embodiment, the value of the inductor 216 may be between approximately 25 micro-Henries and 125 micro-Henries. The value of the inductor 216 may control the pulse width, the amount of dampening of the pulse, the peak current of the pulse, and the like. The pulse width and the peak current may be varied based on the speed of the press and the desired outcome for the electrical pulse (for example, puncturing of the oxide layer versus welding of the strands), as well as based on other factors, such as the diameter of the wire, the number of strands, the metal material, the length of the wire, and the like.

The switch 202 is activated to send the electrical pulse to the crimped segment 152, such as during the downward component of the crimp stroke. The switch 202 may be a triac, a silicon controlled rectifier (SCR) or another type of electronic switch. The switch 202 is activated when a trigger signal is sent from the trigger 204 to a gate of the switch 202. When the switch 202 is activated, current flows through the switch 202 from the capacitor 210 to the crimped segment 152. The switch 202 may have a holding current and the switch 202 may remain on as long as the current flow from the capacitor 210 remains above the holding current. The switch 202 turns off at the end of the electrical pulse.

The trigger 204 controls a pulse start time of the electrical pulse during the crimp stroke. In an exemplary embodiment, the trigger 204 includes a trigger circuit that provides a gate current to the gate of the switch 202 to turn on the switch 202. In an exemplary embodiment, the trigger 204 includes or receives signals from the position sensor 140. The sensor 140 monitoring the crimp stroke and causes the trigger 204 to activate the electrical pulse at a pulse start time during the crimp stroke. The trigger 204 activates based on the position data from the position sensor 140, such as when the flywheel is at a predetermined rotational position or when the ram 126 is at a predetermined axial position or crimp height. The rotational position of the flywheel may correspond to a predetermined axial position of the ram 126. The pulse start time may depend on the pulse duration. The pulse start time may depend on the target area index and/or the target crimp height, such as approximately 70% AI or approximately 1.5 mm before bottom dead center.

In an exemplary embodiment, the electrical crimp consolidation circuit 150 includes a monitoring circuit 220 to measure and/or record discharge current over time. The monitoring circuit 220 may include a current transformer, an oscilloscope, and/or other electrical components.

Figure 5:
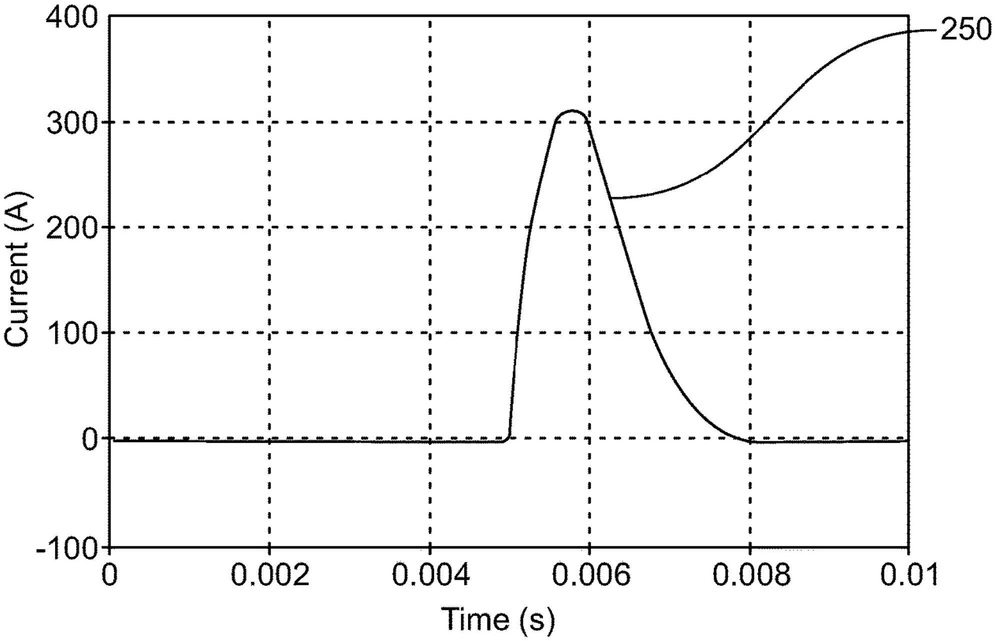
FIG. 5 is an electrical pulse graph showing an exemplary electrical pulse over time.

FIG. 5 is an electrical pulse graph showing an exemplary electrical pulse 250 over time. The electrical pulse 250 has a pulse width of between approximately 1 and 2 ms; however, the pulse width may be dependent on the crimp speed to ensure that the electrical pulse is delivered at an advantageous time of the crimping process, such as after the strands are compressed but before deformation of the strands. The electrical pulse 250 has a peak current of approximately 300 A; however the peak current may vary depending on the components of the electrical crimp consolidation circuit 150 and the wire assembly. The electrical pulse 250 is well-damped pulse having most of the energy dissipated at the start of the pulse, which may encourage fritting. Other peak currents and pulse widths are possible in alternative embodiments.

Figure 6:
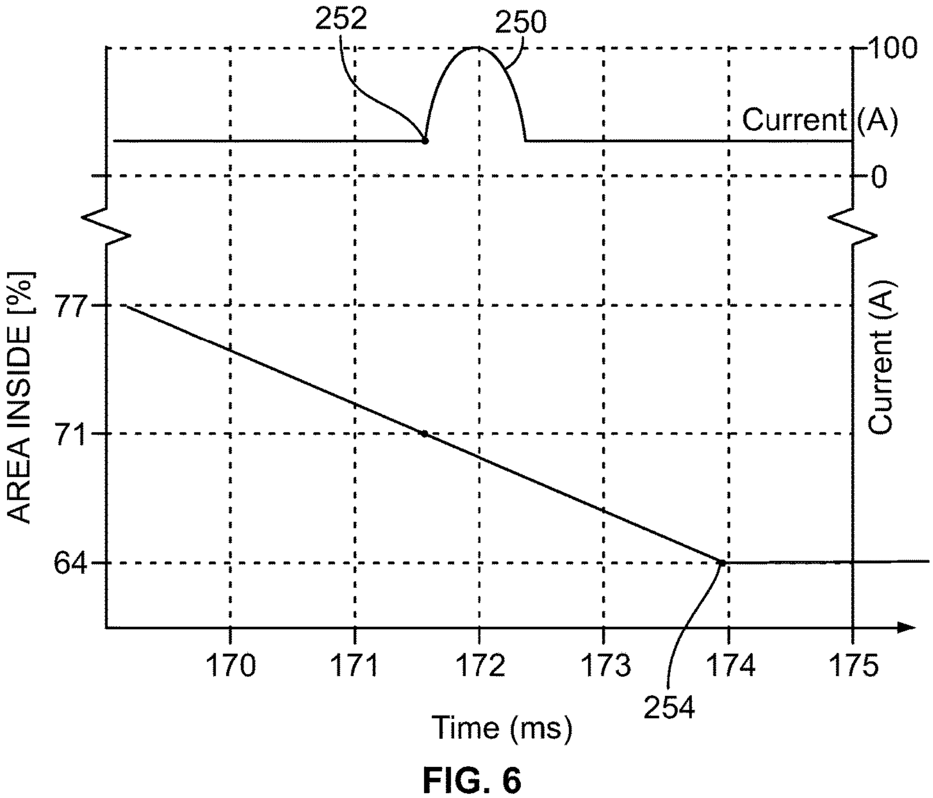
FIG. 6 is a timing graph showing timing of the electrical pulse relative to the area index of the wire.

FIG. 6 is a timing graph showing the timing of the electrical pulse 250 relative to the area index of the wire. The graph shows that the pulse start time 252 occurs during decreasing of the area index, which may occur during the crimping process as the strands are being compressed by the terminal. The graph shows that the pulse occurs prior to full compression 254 of the wire, which is the point where the wire begins deforming. In the illustrated embodiment, full compression 254 occurs at an AI of approximately 64%, which occurs at a time of approximately 174 ms after the start of the crimp stroke. The pulse occurs at an AI of approximately 72%, which occurs at a time of approximately 171 ms after the start of the crimp stroke. The pulse ends at approximately 172 ms after the start of the crimp stroke and thus occurs prior to full compression 254.

Figure 7:
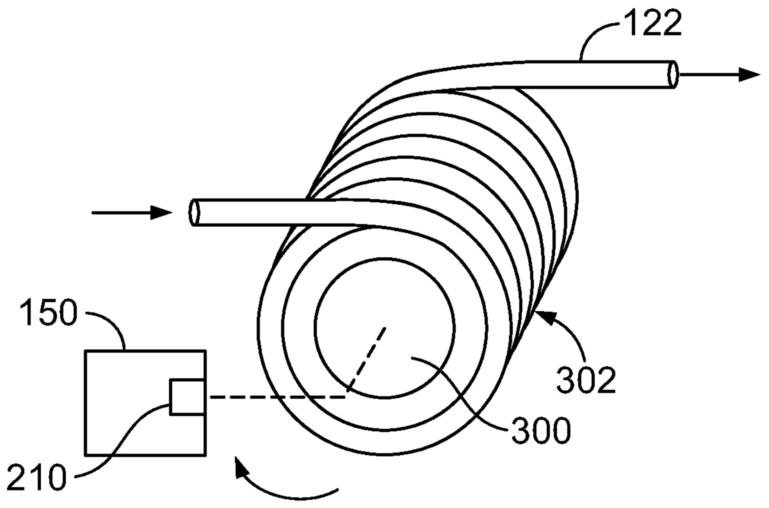
FIG. 7 illustrates the electrical crimp consolidation circuit electrically coupled to the wire in accordance with an exemplary embodiment.

FIG. 7 illustrates the electrical crimp consolidation circuit 150 electrically coupled to the wire 122 in accordance with an exemplary embodiment. As noted above, the electrical crimp consolidation circuit 150 may be directly electrically coupled to the wire 122, such as to an end of the wire opposite the end being crimped. However, such direct electrical coupling may be impractical, such as when the wire 122 is long, such as wound on a spool, because the wire 122 may have too much electrical resistance. FIG. 7 illustrates the electrical crimp consolidation circuit 150 electrically coupled to the wire 122 by inductive coupling.

Energy from the capacitor 210 is coupled using a transformer. The system includes to a non-rotating transformer coil 300 forming a primary. The secondary is formed by the wire 122, which is on a spool 302. The spool 302 may be the main supply spool or may be defined by an auxiliary supply spool remote from the main supply spool. As the spool rotates, the wire 122 is inductively coupled to the energy from the capacitor 210.

Figure 8:
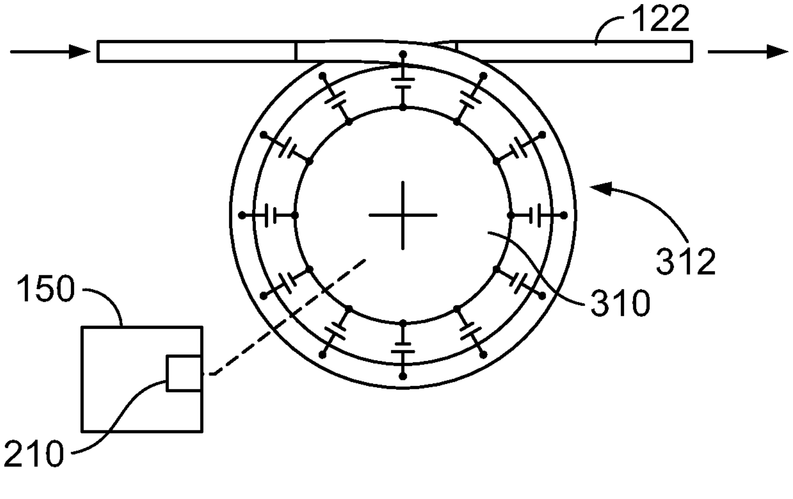
FIG. 8 illustrates the electrical crimp consolidation circuit electrically coupled to the wire in accordance with an exemplary embodiment.

FIG. 8 illustrates the electrical crimp consolidation circuit 150 electrically coupled to the wire 122 in accordance with an exemplary embodiment. FIG. 8 illustrates the electrical crimp consolidation circuit 150 electrically coupled to the wire 122 by capacitive coupling. Energy from the capacitor 210 is coupled to a cylindrical electrode 310 coaxially positioned in the center of the spool 312. The spool 312 may be the main supply spool or may be defined by an auxiliary supply spool remote from the main supply spool. As the spool rotates, the wire 122 is capacitively coupled to the energy from the capacitor 210, as represented by the distributed capacitance between the inner cylindrical electrode 310 and the wire spool 312.

Figure 9:
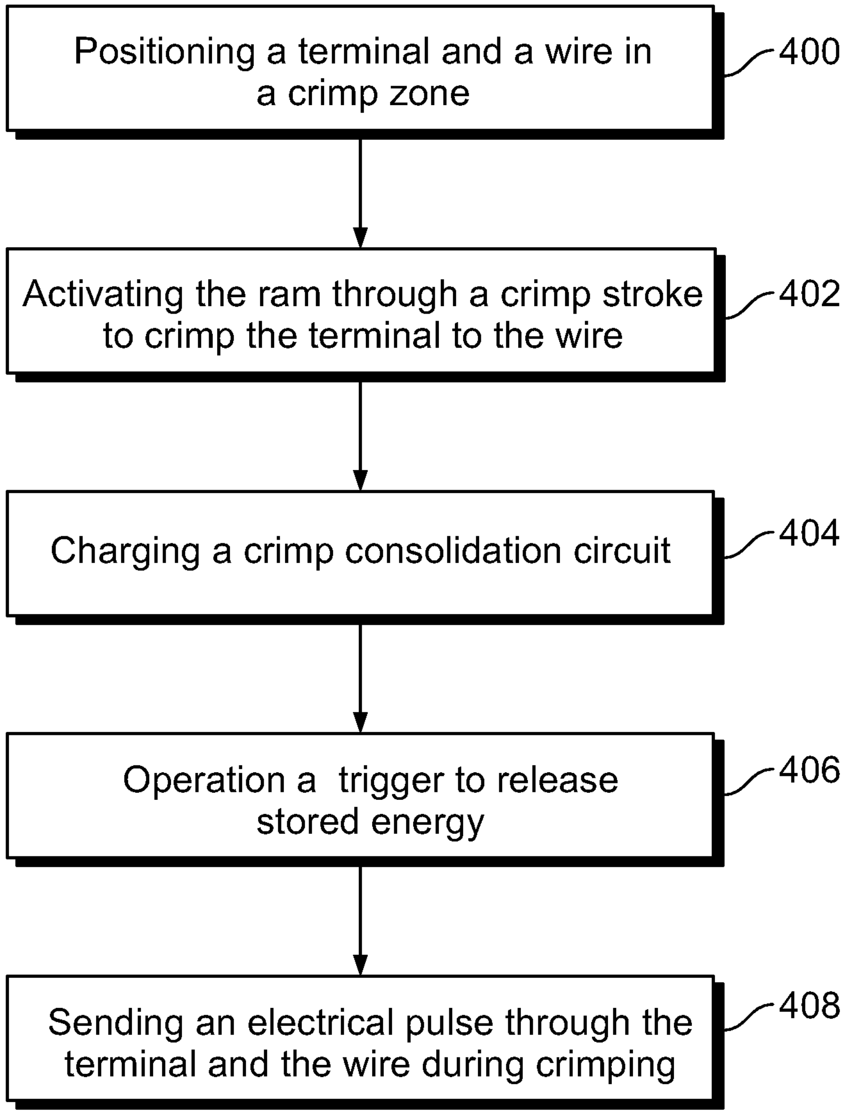
FIG. 9 is a flow chart of a method of crimping the terminal to the wire using the terminal crimping machine and the electrical crimp consolidation circuit.

FIG. 9 is a flow chart of a method of crimping the terminal 120 to the wire 122 using the terminal crimping machine 100. The method, at 400, includes the step of positioning the terminal 120 and the wire 122 in the crimping zone 106 between the anvil 128 and the movable ram 126. The wire 122 may be initially loosely laid in the crimp barrel of the terminal such that the strands 124 of the wire 122 have a relatively high area index.

The method, at 402, includes actuating the ram 126 through a crimp stroke from a released position in an advancing direction to a bottom dead center position and in a retracting direction back to the released position. The ram 126 crimps the terminal 120 to the wire 122 to form the crimped segment 152 as the ram 126 is driven downward in the advancing direction. The method includes compressing the strands 124 together as the terminal 120 is crimped around the wire 122, which reduces the area index. Eventually, the strands may deform as the terminal 120 is crimped around the wire 122.

The method includes charging 402 the electrical crimp consolidation circuit 150, operating 404 a trigger to release the stored energy in the form of an electrical pulse, and sending 406 the electrical pulse through the crimped segment 152 during the crimp stroke as the ram is actuated in the advancing direction. The trigger is operated to activate a switch to send the electrical pulse to the crimped segment 152. The trigger may be operated as the ram is actuated. The electrical pulse is sent to the crimped segment 152 to cause fritting in the oxide layers of the strands 124. The electrical pulse may be sent after compression of the strands 124 but prior to deformation of the strands during the crimp stroke.

Electrical crimp consolidation using the electrical crimp consolidation circuit 150 punctures the surface oxide layers on the strands 124 and promotes formation of inter-wire bonds. The electrical signal of the electrical pulse is passed through the wire 122 to the terminal 120 as the crimp is being formed. High voltage of the signal perforates the surface oxide layers and allows the formation of conductive a-spots within the strand bundle. High current then welds the strands together at the a-spots to increase electrical conductivity and stabilize the crimp mechanically. The electrical crimp consolidation results in reduced end-to-end wire resistance due to the improved electrical connection between the strands and the terminal and between the adjoining strands at the a-spots. Electrical crimp consolidation is a clean process and may avoid the need for additives. Electrical crimp consolidation may avoid the need for high pressure contact points, resulting in lower crimping forces.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A terminal crimping machine that crimps a terminal to a wire, the terminal crimping machine comprising:
- crimp tooling defining a crimping zone that receives the terminal and the wire, the crimp tooling being actuated during a crimp stroke to form a crimped segment between the terminal and the wire; and
- an electrical crimp consolidation circuit electrically connected to the crimped segment and operated during the crimp stroke to provide an electrical pulse to at least one of the wire and the terminal of the crimped segment before completion of the crimp stroke, wherein the electrical crimp consolidation circuit causes fritting in the wire.

2. The terminal crimping machine of claim 1, wherein the electrical crimp consolidation circuit causes fritting between adjacent strands of the wire.

3. The terminal crimping machine of claim 2, wherein the electrical crimp consolidation circuit controls a pulse energy, a pulse potential and a pulse duration of the electrical pulse to cause fritting in the wire.

4. The terminal crimping machine of claim 2, wherein the electrical crimp consolidation circuit causes A-fritting and B-fritting.

5. The terminal crimping machine of claim 1, wherein the electrical crimp consolidation circuit causes a strand bonding between strands of the wire by passing the electrical pulse through the wire during the crimp stroke.

6. The terminal crimping machine of claim 1, wherein the electrical crimp consolidation circuit times sending of the pulse during the crimp stroke after strands of the wire are compressed by the terminal and prior to strand deformation of the strands by crimping of the terminal around the wire.

7. The terminal crimping machine of claim 1, wherein the electrical crimp consolidation circuit times sending of the pulse during the crimp stroke after an area index of the crimped segment is reduced during the crimp stroke and prior to the crimped segment achieving a final crimped area index.

8. The terminal crimping machine of claim 1, further comprising a termination tool having an actuator operably coupled to the crimp tooling, the crimp tooling comprising an anvil and a ram movable by the actuator with the crimping zone being defined between the ram and the anvil that receives the terminal and the wire, the ram being actuated by the actuator during a crimp stroke in an advancing direction and then in a retracting direction, the ram being actuated by the actuator in the advancing direction from a released position to an initial contact position where the ram makes initial contact with the terminal, the ram being actuated by the actuator in the advancing direction from the initial contact position to form the crimped segment, the ram being actuated by the actuator in the advancing direction from the initial contact position to a bottom dead center position where the ram is at the closest position to the anvil during the crimp stroke, the ram being actuated by the actuator in the retracting direction from the bottom dead center position to the released position where the ram is released from the crimped segment, wherein the electrical crimp consolidation circuit sends the electrical pulse to the crimped segment after the ram is in the initial contact position and before the ram is in the bottom dead center position.

9. The terminal crimping machine of claim 1, wherein the electrical crimp consolidation circuit includes a switch being activated to send the electrical pulse to the crimped segment.

10. The terminal crimping machine of claim 9, wherein the switch is one of a triac or an SCR.

11. The terminal crimping machine of claim 1, wherein the electrical crimp consolidation circuit include a trigger for controlling a pulse start time of the electrical pulse during the crimp stroke.

12. The terminal crimping machine of claim 11, wherein the trigger includes a sensor monitoring the crimp stroke and activating the electrical pulse during the crimp stroke.

13. The terminal crimping machine of claim 11, further comprising an actuator operably coupled to the crimp tooling and driving the crimp tooling during the crimp stroke, the trigger comprising a sensor monitoring a position of the actuator to activate the electrical pulse during the crimp stroke.

14. The terminal crimping machine of claim 1, wherein the electrical crimp consolidation circuit includes a power supply having a capacitor storing energy and a switch being activated to release the energy from the capacitor as the electrical pulse to the crimped segment.

15. The terminal crimping machine of claim 14, wherein the electrical crimp consolidation circuit further comprises an inductor between the capacitor and the switch to control a pulse width and a peak current of the electrical pulse.

16. The terminal crimping machine of claim 14, wherein the electrical crimp consolidation circuit further comprises a power supply coupled to the capacitor and a resistor between the power supply in the capacitor.

17. The terminal crimping machine of claim 14, wherein the electrical crimp consolidation circuit include a trigger coupled to the switch for activating the switch to control a pulse start time of the electrical pulse during the crimp stroke.

* * * * *